United States Patent
Jones et al.

(10) Patent No.: US 7,185,904 B1
(45) Date of Patent: Mar. 6, 2007

(54) AUXILIARY VEHICLE STEP

(76) Inventors: John J. Jones, P.O. Box 134, Zullinger, PA (US) 17272; Jason L. Petre, 10278 Claylick Rd., Mercersburg, PA (US) 17236

( * ) Notice: Subject to any disclaimer, the term of this patent is extended or adjusted under 35 U.S.C. 154(b) by 0 days.

(21) Appl. No.: 11/337,577

(22) Filed: Jan. 24, 2006

(51) Int. Cl.
*B60R 3/00* (2006.01)

(52) U.S. Cl. .................. 280/166; 280/482; 280/164.1

(58) Field of Classification Search ......... 280/163, 280/164.1, 166, 75, 78–88, 23–30, 334.1
See application file for complete search history.

(56) References Cited

U.S. PATENT DOCUMENTS

| | | | |
|---|---|---|---|
| 3,357,719 A * | 12/1967 | McCrea | ............. 280/163 |
| 4,017,093 A * | 4/1977 | Stecker, Sr. | ............. 280/163 |
| 4,753,447 A | 6/1988 | Hall | |
| 5,137,293 A | 8/1992 | Graves et al. | |
| 5,501,475 A | 3/1996 | Bundy | |
| 5,803,475 A | 9/1998 | Dick | |
| 5,897,125 A | 4/1999 | Bundy | |
| 6,170,842 B1 * | 1/2001 | Mueller | ............. 280/163 |
| 6,170,843 B1 | 1/2001 | Maxwell et al. | |
| 6,511,086 B2 | 1/2003 | Schlicht | |
| 6,530,588 B1 | 3/2003 | Varney et al. | |
| 6,682,086 B1 * | 1/2004 | Erickson | ............. 280/166 |
| 6,769,704 B2 | 8/2004 | Cipolla | |
| 6,851,692 B2 | 2/2005 | Mitchell | |

* cited by examiner

*Primary Examiner*—J. Allen Shriver
*Assistant Examiner*—Cynthia F. Collado
(74) *Attorney, Agent, or Firm*—Lawrence R. Franklin

(57) ABSTRACT

An auxiliary step is primarily designed for facilitating entering and exiting the bed of a pickup truck. The step includes a shank for coupling a supporting post to an existing trailer hitch. A step is rotationally and linearly slidable on the supporting post for universal adjustment relative to the truck bed.

16 Claims, 7 Drawing Sheets

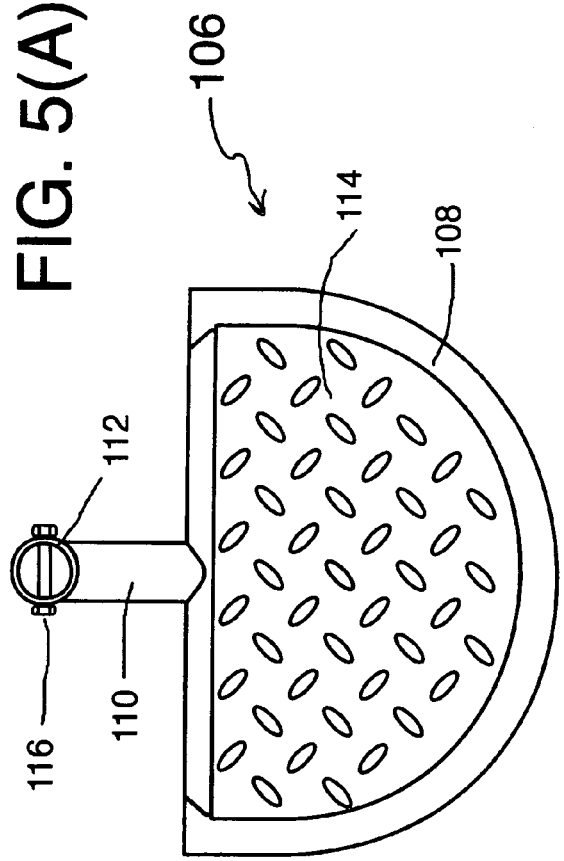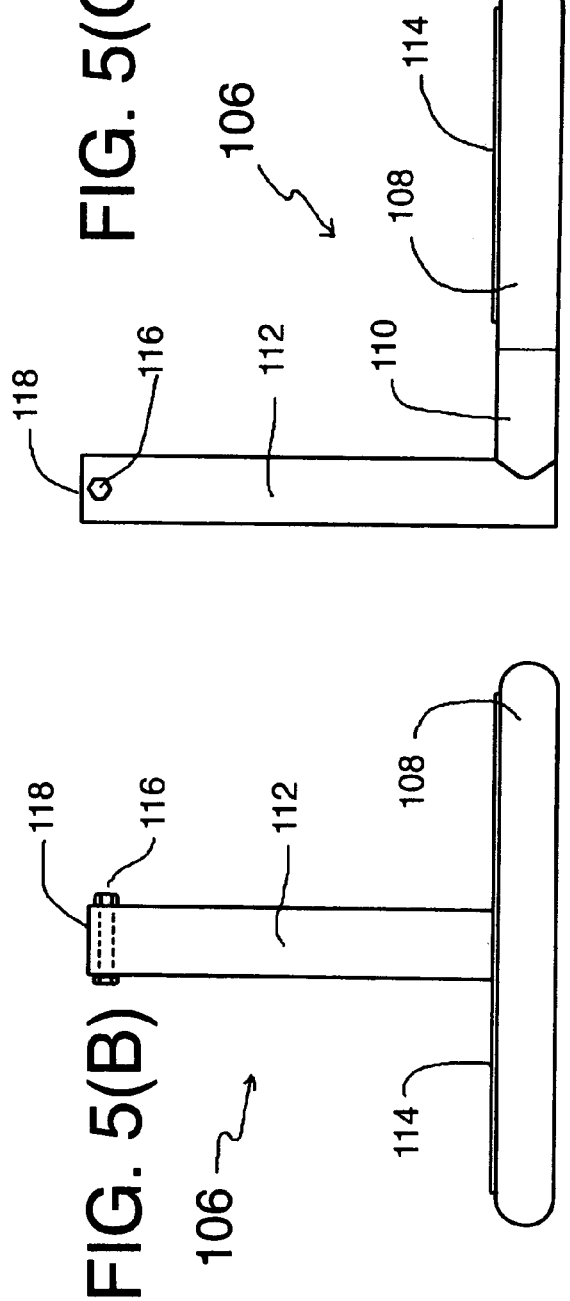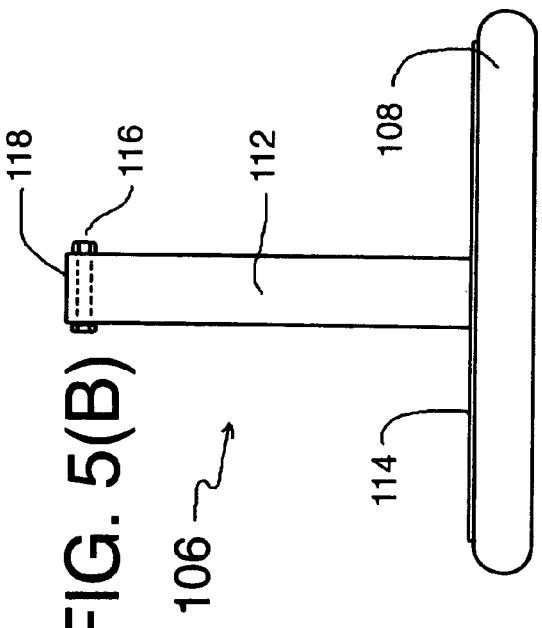

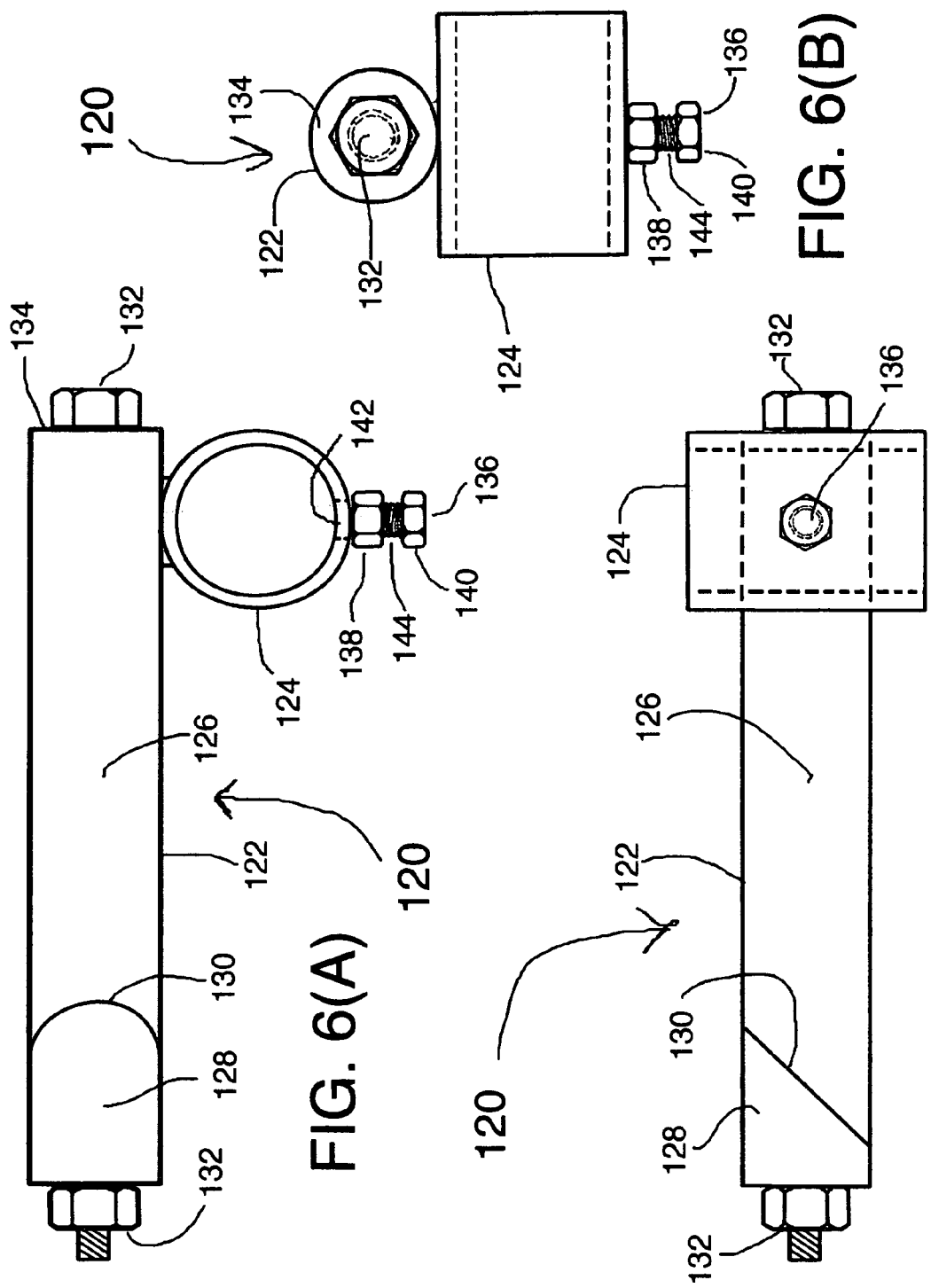

AUXILIARY VEHICLE STEP

CROSS-REFERENCES TO RELATED APPLICATIONS

Not Applicable.

STATEMENT REGARDING FEDERALLY SPONSORED RESEARCH OR DEVELOPMENT

Not Applicable.

THE NAMES OF PARTIES TO A JOINT RESEARCH AGREEMENT

Not Applicable.

REFERENCE TO A "SEQUENCE LISTING"

Not Applicable.

BACKGROUND OF THE INVENTION

1. Field of the Invention

This invention relates to an auxiliary step for mounting on a pickup truck (or other applicable vehicle) to assist in entry into the truck bed.

2. Description of Related Art Including Information Disclosed Under 37 CFR 1.97 and 1.98

Many of today's vehicles are relatively large with high ground clearances which often makes entering or exiting quite difficult. Some manufacturers include in the design of their vehicle a built-in step intermediate the ground and the floor of the vehicle for facilitating access into the passenger compartments, but few provide a step for safely reaching the roof rack on top of SUVs, RVs, and campers, for instance, or for climbing into the cargo bed of pickup trucks and flatbed trucks, step-bumpers (which are usually too high) notwithstanding. The problem has given rise to a number of auxiliary step inventions to fill the need.

Auxiliary steps have been attached to their vehicle in a number of ways. Some attach a step to the front or back bumper; McCrea, U.S. Pat. No. 3,357,719, Hall, U.S. Pat. No. 4,753,447, and Mueller, U.S. Pat. No. 6,170,842, are representative. Some fix an auxiliary step to the side frame of their vehicle; see Stecker, Sr., U.S. Pat. No. 4,017,093, Graves et al., U.S. Pat. No. 5,137,293, Bundy, U.S. Pat. No. 5,501,475, and Bundy, U.S. Pat. No. 5,897,125.

The instant invention is directed primarily to an auxiliary step for assisting entry into and exit from the back of pickup trucks, although its applicability to other types of vehicles is readily apparent. Prior patents featuring pickup truck auxiliary steps include Dick, U.S. Pat. No. 5,803,475, Maxwell et al., U.S. Pat. No. 6,170,843, Schlicht, U.S. Pat. No. 6,511,086, Varney et al., U.S. Pat. No. 6,530,588, Erickson, U.S. Pat. No. 6,682,086, Cipolla, U.S. Pat. No. 6,769,704, and Mitchell, U.S. Pat. No. 6,851,692. All of these except Varney et al. and Mitchell connect their step by inserting a step support bar into the square receiver tube of the conventional receiver type trailer hitch. While effective for their purposes, they all require removal of the step in order to insert a draw bar for pulling a trailer. Varney et al. clamp their step onto the crossbar of the aforesaid receiver type trailer hitch; it is a complicated assembly which will either interfere with any trailer attached to the pickup truck or will be inaccessible when the tailgate of the pickup is lowered. Mitchell attaches a step to the ball hitch of the drawbar; while it does not interfere with a trailer being towed, it is always centrally located behind the truck and is rendered inaccessible by the lowering of the tailgate.

Dick, Maxwell et al., Schlicht, Varney et al., and Cipolla include limited linear adjustments in an attempt to provide a means for adapting their steps to specific trucks, and Dick, Maxwell et al., Schlicht, and Varney et al. pivot their steps for storage, but none of them disclose a mechanism for universal adjustment to tailor their steps to individual vehicles.

BRIEF SUMMARY OF THE INVENTION

The present invention overcomes the difficulties described above by providing an auxiliary step comprising few parts, strongly and durably connected together to provide a universally adjustable step which can be left on the truck indefinitely without interfering with any other truck function or operating state.

Specifically, the disclosed and claimed auxiliary step comprises an integral supporting framework attached to the truck which supports a step assembly adjustable relative to the supporting framework. To avoid any ambiguity in the description and claims which might arise due to the multiple use of the word "step," the term "step" when used alone without any modifiers, e.g., "assembly", "EZ-UP", and "auxiliary" denotes the element of the combination on which the foot would be placed when stepping onto the truck (40 in FIGS. 1 and 68 in FIGS. 2–4, and 108 in FIGS. 5 and 7); the phrase "step assembly" refers to the step and any connector integral with the step (step 40 and sleeve 42 in FIG. 1, step 68 and sleeve 64 in FIGS. 2–4, and step 108, stem 110, and post 112 in FIGS. 5 and 7); and the phrases "EZ-UP Step" and "auxiliary step" will be used to denote the entire combination of elements (32 in FIG. 1, 60 in FIGS. 2–4, and 146 in FIG. 7). When attached to the truck, the step is located at a rear corner of the pickup bed, providing easy access to the cargo bed regardless of whether or not the tailgate is open or closed, and it is completely out of the way of any trailer or other vehicle being towed by the truck. Because of its design and attachment location, the inventive step can be permanently attached to the truck, aesthetically blending in with the truck design, or conveniently and easily removed therefrom.

OBJECTS OF THE INVENTION

It is an object of the invention to provide an auxiliary step for a motor vehicle, primarily a pickup truck, which is easily and quickly attached or removed from the truck.

It is a further object of the invention to provide an auxiliary step for a motor vehicle which is attached via the open ends of the crossbar of a conventional trailer hitch which itself is permanently attached to the vehicle.

It is a further object of the invention to provide an auxiliary step for a motor vehicle in which the step is universally adjustable relative to said crossbar and thereby to the vehicle body.

It is a further object of the invention to provide an auxiliary step for a pickup truck which, when in use, is located adjacent the back corners of the pickup truck, accessible whether or not the tailgate is up or down and whether or not a trailer is being towed.

It is a further object of the invention to provide an auxiliary step for a motor vehicle which is rugged in construction and relatively inexpensive to manufacture.

BRIEF DESCRIPTION OF THE SEVERAL VIEWS OF THE DRAWINGS

The foregoing and other objects, aspects, uses, and advantages of the present invention will be more fully appreciated as the same becomes better understood from the following detailed description of the present invention when viewed in conjunction with the accompanying drawings, in which:

FIGS. 5(A)–(C) are top, front, and side views, respectively, of a third embodiment of vehicle step assembly;

FIGS. 6(A)–(C) are top, end, and side views, respectively, of a third embodiment of an auxiliary step supporting framework.

DETAILED DESCRIPTION OF THE INVENTION

Figure 1:
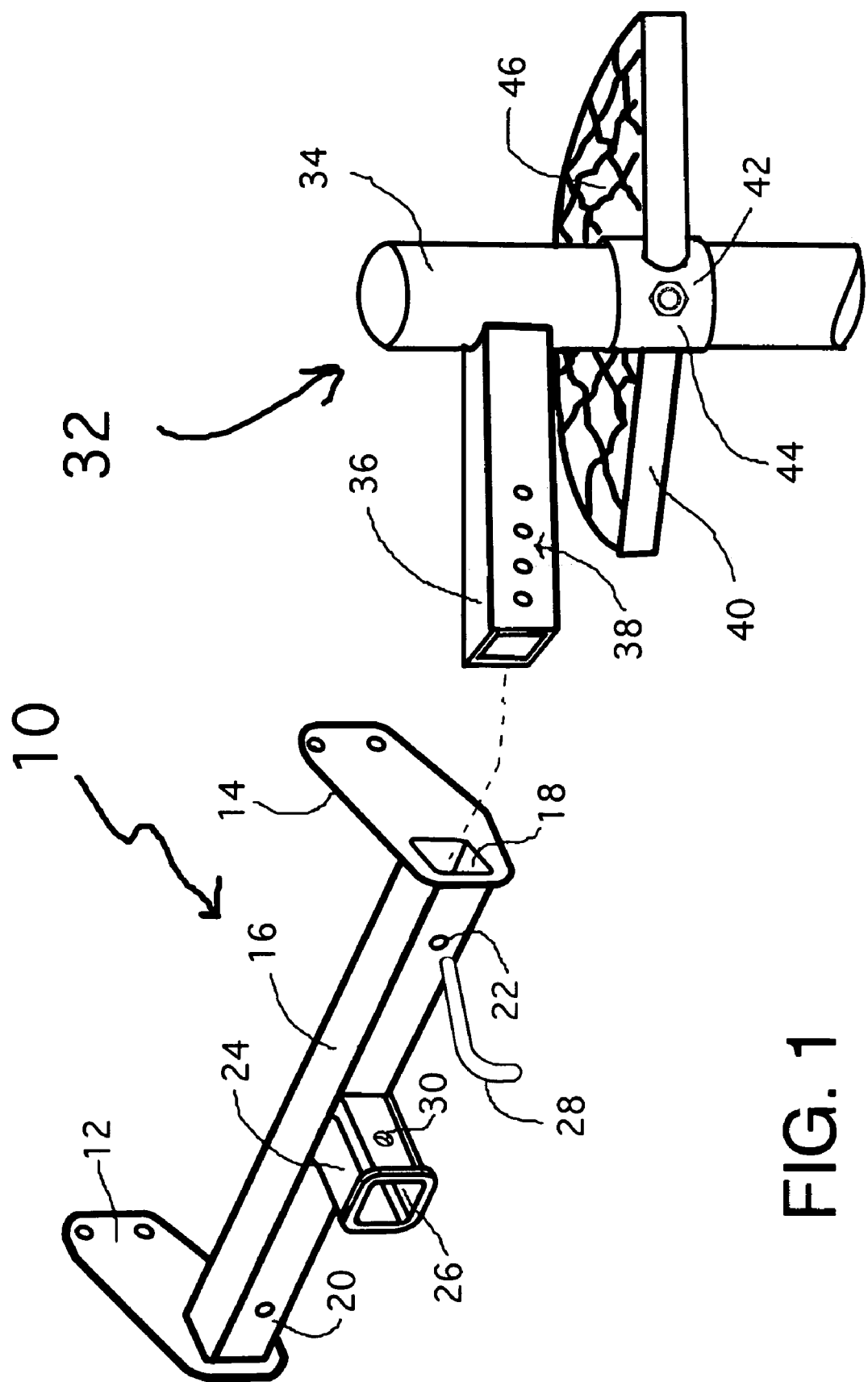
FIG. 1 is a diagrammatic perspective view of a first preferred embodiment of the present invention in association with a first type of conventional trailer hitch.

A conventional receiver-type trailer hitch 10 for a pickup truck is shown in FIG. 1. A pair of mounting brackets 12 and 14 are affixed to the frame of the truck (not shown) by being bolted thereto. A square tubular crossbar 16 is welded to the mounting brackets 12 and 14 and extends transversely of the truck, generally under the trailing edge of the truck bed, as is common practice. Crossbar 16 is a square hollow cylinder having an opening 18 at each end. If not already present in crossbar 16, a pair of apertures 20 and 22 are formed in the opposing front and back, flat, vertical surfaces at selected distances spaced from open ends 18. A receiver 24 comprising a hollow, square tube extends behind and away from the pickup truck, substantially parallel to the roadway, and perpendicular to crossbar 16. The open end 26 of receiver 24 accepts any one of a variety of conventional draw bars (not shown) having various known types of hitches. When a draw bar is inserted within receiver 24, it is secured therein by a suitable fastener, such as by a latching pin similar to latching pin 28 inserted through aperture 30 and an aligned aperture through the draw bar.

Also shown in FIG. 1 is a first embodiment 32 of the inventive EZ-UP Step designed to be releasably attached to trailer hitch 10.

The three preferred embodiments of the inventive auxiliary step comprise a shank which is secured to the crossbar of the trailer hitch, a step on which the user steps when accessing the pickup truck bed, and a coupler which connects the step to the shank while providing universal adjustment of the step relative to the shank. In the first two embodiments, the coupler comprises a support post integrally joined with the shank and a sleeve integrally joined with the step. In the third embodiment, the coupler comprises a sleeve integrally joined with the shank and the support post integrally joined with the step. In all embodiments, universal adjustment of the step relative to the shank is effected by relative linear and rotatable movement of the sleeve and the post; a fastener fixes the orientation of sleeve and post after the universal adjustment thereof.

The supportive backbone of EZ-UP Step 32 comprises a vertical, cylindrical post 34. A square tubular shank 36 is rigidly fixed to and extends orthogonally from post 34 and is adapted to be inserted into the hollow interior of crossbar 16 though opening 18, as shown schematically by the dashed lines. Together, post 34 and shank 36 comprise an integral supporting framework. EZ-UP Step 32 is not shown to scale. Obviously, for example, the length of shank 36 is determined by the size of the truck for which EZ-UP Step 32 is intended. Shank 36 fits closely yet telescopically slides freely within the hollow interior of crossbar 16. Shank 36 is secured to crossbar 16 by a latching mechanism, or latch. The latching mechanism for this embodiment comprises a plurality of positioning apertures 38 linearly arranged along shank 36 and a latching pin 28. EZ-UP Step 32 is attached to crossbar 16 by aligning one of apertures 38 with aperture 22 (or 20) and inserting latching pin 28 through the aligned apertures. The distance EZ-UP Step 32 is spaced from the truck bed is adjusted by the selection of a specific aperture 38. Latching pin 28 is shown only diagrammatically; any similarly functioning pin, such as a nut and bolt or a clevis pin with a retaining clip or cotter pin, is a patentable equivalent.

Shank 36 is preferably linear as shown in order to position a step 40 to the side of the pickup truck bed. It is contemplated, however, that shank 36 comprise one or more segments integrally connected together at selected angles, from close to zero degrees to beyond ninety degrees. The first segment telescoped within crossbar 16 must, of course, be of adequate length to provide sufficient support for anyone stepping on EZ-UP Step 32, and the angle the secondary segment diverges from the first segment is selected to position step 40 behind the pickup truck in a desired position.

Preferably shank 36 is welded directly to post 34. Being rigid relative to post 34 is important, as it ensures the structural stability of EZ-UP Step 32, but it is within the purview of the invention that shank 36 be joined to post 34 by any means which effects the desired rigidity. Shank 36 is shown extending from the side of post 34 near the top. This location and orientation is not critical and may be varied depending in large part on the type of truck upon which it will be used. It is also not critical to the functioning of EZ-UP Step 32, but it is preferable that post 34 and shank 36 share a common plane. That is, the extended longitudinal axis of post 34 intersects with the extended longitudinal axis of shank 36. This arrangement allows EZ-UP Step 32 to be interchangeable between either end of crossbar 16, and thereby one model can be shifted efficaciously from left to right or vice versa.

Step 40 is welded to a sleeve 42. Sleeve 42 is a cylindrical tube which is universally adjustable relative to post 34, i.e., sleeve 42 is rotatably and linearly slidable on post 34. Sleeve 42 slides up and down along post 34 to permit adjustment of the vertical position of step 40 between the pickup truck bed and the ground. Rotatable adjustment of sleeve 42 allows step 40 to be angularly oriented relative to the pickup bed. This combination of adjustment, i.e., movement within a polar coordinate system, allows step 40 to be universally oriented relative to the truck to provide optimum exposure of step 40. Universal adjustment of step 40 in combination with the differing depth adjustments of shank 36 in crossbar 16 allows EZ-UP Step 32 to be adapted quickly and easily, with minimal modifications to existing structures, to any specific pickup truck. Universal adjustment of step 40 also permits step 40 to be positioned either behind or to the side of the truck bed, or stored beneath the truck bed and/or bumper when deemed necessary. Sleeve 42 is secured to post 34 at the selected height and angular orientation by a suitable fastener 44. The preferred fastener 44 comprises a nut and bolt combination which functions as a set screw locking sleeve 42 onto post 34; reference should be had to FIGS. 6(A) and 6(B) where an identical fastener 136 is shown more clearly and discussed in more detail.

A non-slip tread 46 is provided on step 40 for safety in entering and exiting the truck bed. Tread 46 can comprise any known surface, including the open grid-work formed by so-called expanded metal, a knurled or roughened non-skid surface, a surface embossed with a pattern, such as the familiar diamond pattern (FIG. 5(A)), rows of holes in a metal plate, a metal plate coated with a frictional substance, or a high friction tread material adhesively fixed to the top of a smooth sheet metal step 40. In short, all known types of step or stair treads are considered patentable equivalents for tread 46.

Step 40 is shown (FIGS. 1, 3, and 4) as substantially beehive shaped and attached centrally at its base to sleeve 42. This is solely for convenience in disclosure. The step shape may be round, square, oval, kidney-shaped, or any other configuration defining a symmetrical or an asymmetrical surface area. The shape may be chosen for any desired reason. The design may be for aesthetic purposes only, for instance, to allow EZ-UP Step 32 to blend into the design of the truck body, and it can include a logo for advertising purposes. Or, the design may be dictated by practical considerations, e.g., to expose a substantial portion of tread 46 adjacent the truck body and/or bumper.

Sleeve 42 can be integrally connected to step 40 at any point around the periphery of step 40 other than centrally as shown, for example, at a corner thereof. Locating the attachment point asymmetrically relative to step 40 would require providing left-hand and right-hand versions of any given model of EZ-UP Step 32. And, step 40 may be spaced from sleeve 42 by a stem between step 40 and sleeve 42 and integral with both.

It should be clear, therefore, that the first disclosed embodiment is representative of the many which could be designed. It is even envisioned that a distinct model could be designed for each make and model of truck. All variations of design, form, shape, and sizes which encompass the disclosed concepts are considered within the scope of the appended claims.

The first embodiment of the inventive EZ-UP Step is a basic, inexpensive model which provides the desired benefits of the invention. EZ-UP Step 32 comprises four parts movable relative to each other: a supporting post 34 with integral shank 36, a step 40 with integral sleeve 42, a set screw 44, and a latching pin 28. All four parts are preferably made of any convenient material which ensures its strength and durability. It is contemplated, for example, to make various embodiments of EZ-UP Step 32 of steel, e.g., mild steel, carbon steel, and stainless steel, so long as the thickness of the steel is sufficient to support relatively large persons without deformation. Other materials are also within the scope of the claimed invention, e.g., an aluminum deck plate, and any of many high-strength plastics, fiber reinforced plastics, ABS (Acrylonitrile Butadiene Styrene), etc. The combination is simple in construction, inexpensive to manufacture, and reliable for life. Covering the step with a replaceable cover not only protects step 40 but also opens design possibilities in the choices of materials, e.g., plastic or rubber, colors, patterns, and graphics, including advertising logos.

Since EZ-UP Step 32 is coupled to an existing trailer hitch, once minimal modifications are made, e.g., apertures 20 and 22, it is easy to install in minutes. Simply slide shank 36 into opening 18, align one of apertures 38 with either aperture 20 or 22, and secure in place with latching pin 28. Adjust the height and angular position of step 40, lock in place with set screw 44, and EZ-UP Step 32 is ready to use. The disclosed design, i.e., symmetrical relative to the supportive framework of post 34 and shank 36, has the benefit of EZ-UP Step 32 being reversible, that is, it can be installed on either the driver's side or the passenger's side of the truck and step 40 will assume the same, albeit mirrored, orientation relative to the truck bed and bumper. This simplifies the inventory, as only one model need be stocked. Or, two EZ-UP Steps 32 can be attached to the pickup truck, one on each side, for added convenience.

The first embodiment of EZ-UP Step utilizes the conventional trailer hitch which has a square, hollow, tubular crossbar 16 to mount the EZ-UP Step 32 to a pickup truck. Not all trailer hitches have a square tubular crossbar, however. Also popular are similar trailer hitches provided with a circular tubular crossbar. The second embodiment of EZ-UP Step, FIGS. 2–4, is adapted to be mounted therein.

Figure 2:
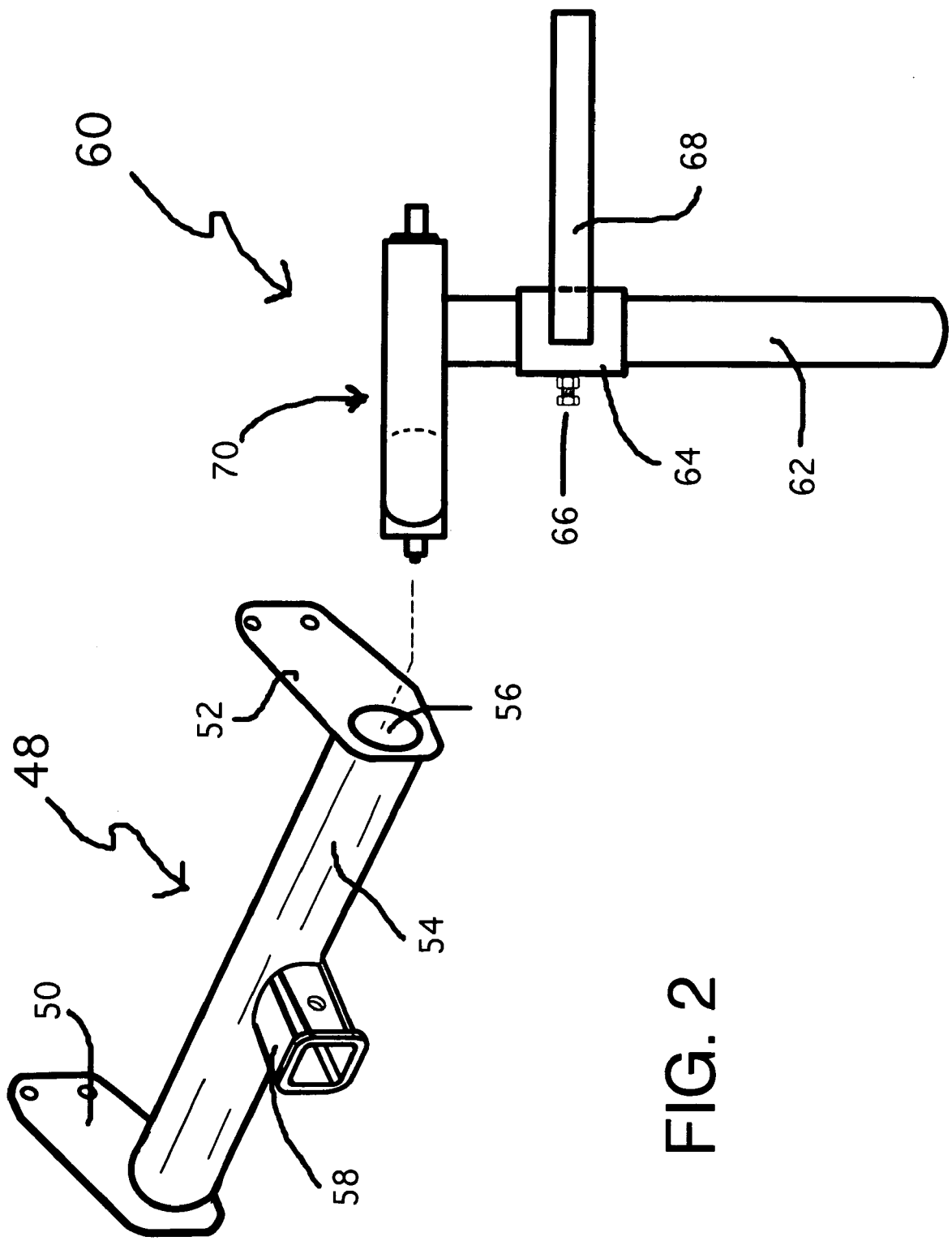
FIG. 2 is a side view of a second preferred embodiment of the present invention in association with a perspective view of a second type of conventional trailer hitch.

FIG. 2 shows a second type of conventional receiver-type trailer hitch 48 which is similar in most respects with receiver-type trailer hitch 10. A pair of mounting brackets 50 and 52 are affixed to the frame of the truck (not shown), and a circular tubular crossbar 54, having an open end 56 at each end, is welded to mounting brackets 50 and 52 and extends transversely of the truck. A receiver 58 comprising a short, hollow, square tube is welded perpendicular to crossbar 54 as shown. Trailer hitch 48 differs from trailer hitch 10 in that the cross-sectional shape of the hollow interior of the crossbar, throughout its length, is circular rather than square. Even though both are functionally equivalent in supporting their respective receivers, the difference can present challenges in adapting trailer hitch 48 to the inventive EZ-UP Step.

Until manufacturers provide trailer hitches 10 and 48 with apertures corresponding to apertures 20 and 22, it will be incumbent upon the purchaser to modify hitches 10 and 48 to include them. Apertures are easily drilled in standard square cross bars, since they have flat surfaces, but a circular tube is not so easily drilled, especially one already mounted on a truck. Although the appended claims include within their purview an embodiment of EZ-UP Step in which the unitary, apertured, square shank 36 is simply replaced by a unitary, apertured, circular shank, the disclosed second embodiment of EZ-UP Step renders user modification of the standard trailer hitch unnecessary.

Figure 3:
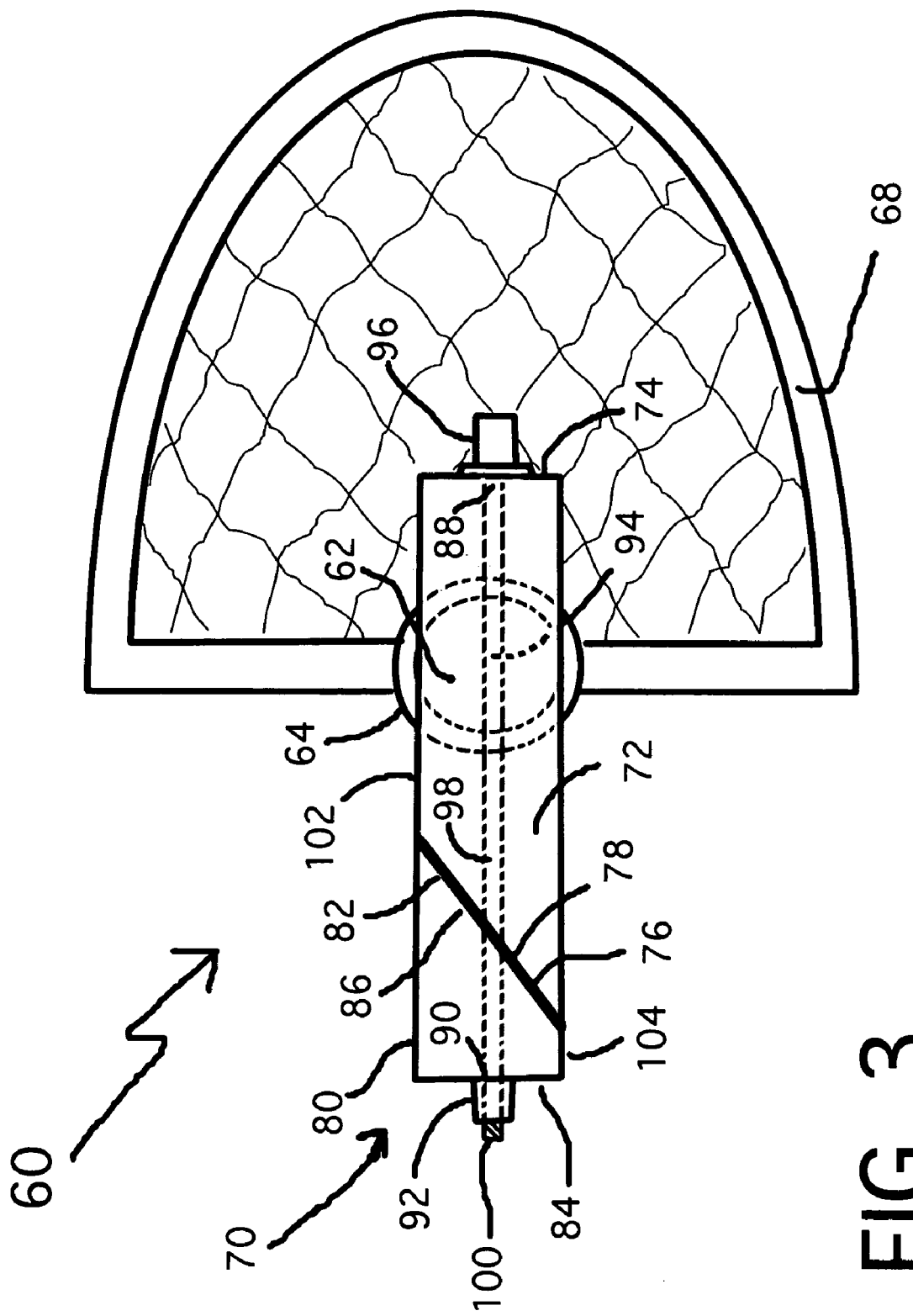
FIG. 3 is a top view of the second preferred embodiment in its quiescent operational state.
Figure 4:
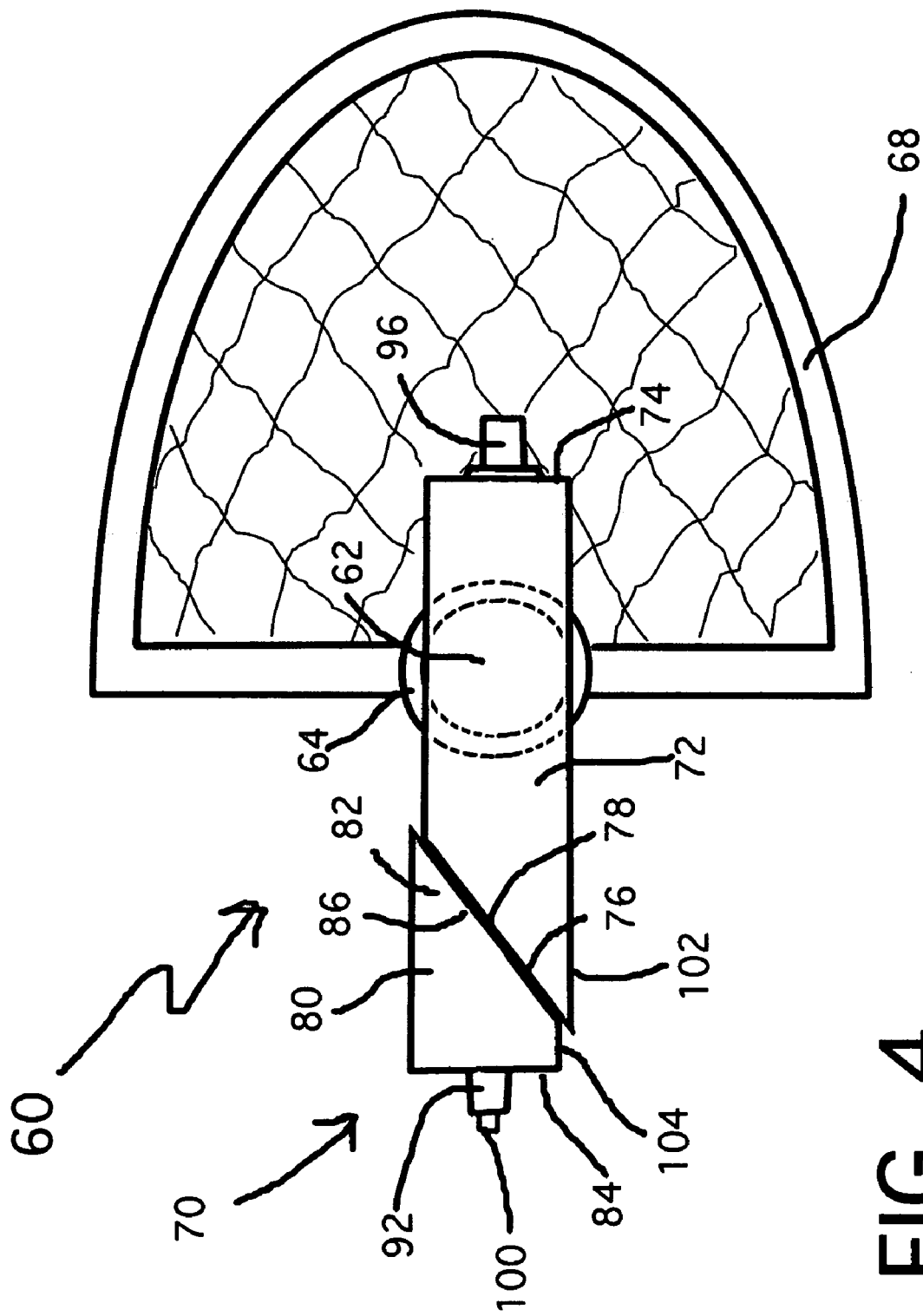
FIG. 4 is a top view of the second preferred embodiment in its active operational state.

Referring to FIGS. 2–4, EZ-UP Step 60 shares much of the structure of EZ-UP Step 32, namely, a cylindrical post 62, a sleeve 64 universally adjustable on post 62 and secured thereto by a set screw 66, and a step 68, similarly constructed to step 40, integral with sleeve 64. Universal adjustment of step 68 by sliding sleeve 64 axially and rotationally relative to post 62, and then fixing it in position by means of set screw type fastener 66 is the same as in the first embodiment. (Set screw 66 is not shown in FIGS. 3 and 4 to avoid overcrowding the drawings.) A cylindrical shank 70 is welded to the top of post 62 and extends outwardly for telescopically sliding within cylindrical crossbar 54.

Unlike shank 36, which is integral and unitary, shank 70 comprises a plurality of parts coacting to bind shank 70 within cross bar 54. For the details of shank 70, refer to FIGS. 3 and 4, which show top views of EZ-UP Step 60 in two operational states. Shank 70 is a split shank formed by cutting through a hollow, circular tube at an angle, as most clearly seen in FIGS. 3–4 and 6–7. Shank 70 comprises a main body portion 72 integrally fixed to the top of post 62 (FIG. 2). Body portion 72 is hollow and cylindrical with one end 74 substantially square with body portion 72. End 74 is closed, as by a metal plate welded to body portion 72, or semi-closed, as by a latticework. The opposite end 76 of body portion 72 is open and has a linearly sloping periphery 78. Shank 70 further comprises a secondary body portion 80 having an open end 82 and an opposite closed or semi-closed end 84. Open end 82 has a linearly sloping periphery 86 which faces and is complementary with linearly sloping periphery 78. Ends 74 and 84 include coaxial apertures 88 and 90, respectively, therethrough (FIG. 3). End 84 has a nut 92 welded thereto; the threaded interior of nut 92 is coaxial with aperture 90. A bolt 94 includes a flanged head 96, a shaft 98, and an externally threaded free end 100 (FIG. 3). Free end 100 threadedly mates with the internal threads of nut 92. Aperture 88 in end 74 of main body portion 72 is slightly larger than the diameter of shaft 98, so that bolt 94 turns freely therein with flanged head 96 resting against the metal plate or latticework closing end 74. Of course, open sloping ends 78 and 86 can be partially closed with their own metal plates, so long as they include coaxial apertures for the free passage and rotation of bolt 94 as well as not restrict the functioning of shank 70 to be disclosed shortly.

While shank 36 can be attached to post 34 at any convenient place, it is preferable to affix shank 70 to the top of post 62 in the manner seen in the side view of EZ-UP Step 60 in FIG. 2, since fixing shank 70 to the top of post 62 avoids any interference with the operations of bolt 94. Additionally, intersecting the longitudinal axes of shank and post provides the previously discussed advantage of being able to shift a single model of EZ-UP Step 60 from one side of the truck to the other. However, shank 70 could as easily be welded tangentially to the side of post 62 and still function as well.

FIGS. 3 and 4 illustrate the coupling mechanism, or coupler, by which EZ-UP Step 60 is secured to trailer hitch 48.

Shank 70 is assembled by inserting bolt 94 through aperture 88 in closed end 74 of main body portion 72, through body portion 72, and out through open end 76. The threaded free end 100 of bolt 94 is inserted into open end 82 of secondary body portion 80 and threaded into nut 92. If secondary body portion 80 is held against rotation, tightening of bolt 94 draws the secondary body portion 80 toward main body portion 72, where the abutting contact of complementary sloping peripheries 78 and 86 forces the two body portions into the orientation shown in FIG. 3, in which the two outer cylindrical surfaces 102 and 104 of main body portion 72 and of secondary body portion 80, respectively, form a smooth, continuous cylinder from end 74 to end 84. In this operational state, cylindrical shank 70 is easily inserted to differing depths into the hollow interior of cylindrical, tubular crossbar 54, where it fits closely but not bindingly.

The disclosed structure of shank 70 comprises a latching mechanism, specifically a latching cam, which operates to attach EZ-UP Step 60 to crossbar 54. With the close abutting contact of complementary sloping peripheries 78 and 86 preventing relative rotation between main body portion 72 and secondary body portion 80, tightening of bolt 94 cams the sloping edge 86 of secondary body portion 80 up the sloping edge 78 of main body portion 72 which results in main body portion 72 and secondary body portion 80 being skewed out of axial alignment to the operational state shown in exaggeration in FIG. 4. Since the smooth, continuous cylinder formed by the axially aligned body portions fits closely within the hollow interior of cylindrical tubular cross bar 54, camming the body portions out of alignment causes cylindrical shank 70 to bind in cylindrical tubular cross bar 54, thereby attaching EZ-UP Step 60 to trailer hitch 48.

It is clear that providing split shank 70 with a square cross-section in order to fit into an unapertured square crossbar 16 is within the disclosed inventive concepts and thereby within the scope of the appended claims.

Figure 7:
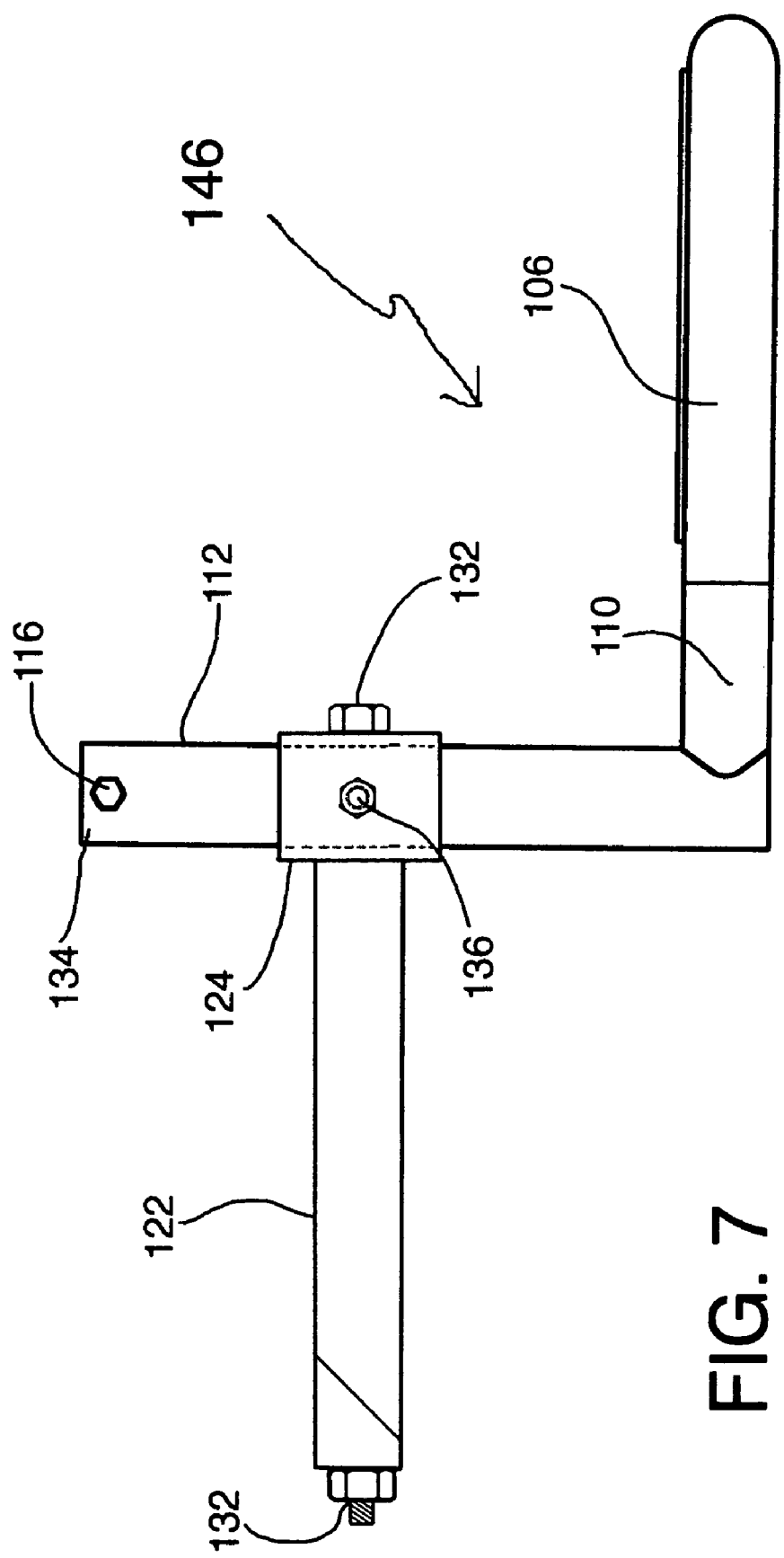
FIG. 7 is a side view of the supporting framework and step assembly of the third embodiment operatively assembled together.

A third preferred embodiment is shown in FIGS. 5–7.

In the first two embodiments, posts 34 and 62 have finite lengths and descend a fixed distance below their integral shanks 36 and 70. For high clearance vehicles, this is not a problem, but for smaller pickup trucks travelling over rough terrain, it is possible that the bottoms of posts 34 and 62 could strike the ground. The third preferred embodiment was designed to eliminate or at least minimize that problem.

Referring to FIGS. 5(A)–(C), step assembly 106 comprises a step 108, a stem 110, and a post 112, all of which are integrally joined together. Step 108 and stem 110 lie in the same horizontal plane, while post 112 extends vertically upwardly therefrom, as shown. Step 108 has a tread 114 on its stepping surface. A stop 116, comprised of a nut and bolt passing through post 112 adjacent the upper end 118, protrudes outwardly from post 112 for a purpose to be disclosed shortly.

A supporting framework 120 is shown in FIGS. 6(A)–(C) and comprises a shank 122 and an integral sleeve 124. Shank 122 is identical with shank 70 (FIGS. 2–4). Consequently, the latching mechanism, or latch, is the same also, namely a latching cam. That is, shank 122 includes a main body portion 126 and a secondary body portion 128 contacting along their mating sloped peripheries 130. A latching cam comprises the mating peripheries 130 coacting with a nut and bolt combination 132 to skew body portions 126 and 128 into binding relationship with a conventional crossbar, either a square crossbar 16 (FIG. 1) or a circular crossbar 54 (FIG. 2), depending upon the cross-sectional shape of shank 122, all as previously described. The nut and bolt combination 132 comprises the same nut and bolt combination of the second preferred embodiment (FIGS. 2–4), so it need not be described in further detail.

Sleeve 124 is welded to the side of shank 122 adjacent the closed end 134 of main body portion 126. Sleeve 124 has a hollow circular interior sized to slidingly receive post 112 of step assembly 106. Together post 112 and sleeve 124 comprise a universally adjustable coupler between shank 122 and step 108. A set screw fastener 136 comprises a nut 138 and a bolt 140. Nut 138 is welded to the sidewall of sleeve 124 as shown and threadedly receives bolt 140 therethrough. An aperture 142 (FIG. 6(A)) passes through the aforementioned sidewall of sleeve 124 coaxially with the hollow threaded interior of nut 138; aperture 142 is slightly larger than the threaded body 144 of bolt 140, thus permitting body 144 free passage therethrough. Set screw fastener 136 is identical with set screw fastener 44 previously disclosed.

In order to be able to provide unrestricted functioning of latching cam 130/132 to couple shank 122 with crossbar 54, it has been necessary to attach sleeve 124 tangentially to the side of shank 122. A lever arm has thus been created which transmits a rotational torque to shank 122 attempting to tilt post 112 from vertical and thereby step 108 from horizontal. It has also been found, however, that even with circular shanks and crossbars, the binding of shank 122 within its crossbar is sufficient to preclude rotation of the shank even under heavy usage. Of course, in the embodiment wherein a shank and its associated crossbar both have square cross-sections, rotational forces are naturally resisted.

EZ-UP Step 146 (FIG. 7) is easily assembled. Stop 116 is removed from post 112. Post 112 is inserted through sleeve 124 from the bottom, and step assembly 106 is temporarily secured to supporting framework 120 by lightly tightening set screw fastener 136. Stop 116 is reattached to post 112 where it will limit the downward movement of step assembly 106 by being unable to pass through sleeve 124. It has been found that set screw 136 clamps post 112 sufficiently tightly within sleeve 124 that relative sliding therebetween even during heavy use is non-existent. Nonetheless, it is prudent to provide stop 116 to ensure against accidental separation of step assembly 106 from supporting framework 120.

It is also contemplated to replace the nut and bolt of stop 116 with an internally threaded ring screwed onto an externally threaded end 134 of post 112 to provide a ridge which will prevent post 112 from sliding out of sleeve 124.

Coupling of EZ-UP Step 146 to a pickup truck is just as quick and easy as assembling EZ-UP Step 146. Shank 122 is inserted into the hollow end of a crossbar of a conventional trailer hitch and is secured at the desired location by the tightening of nut and bolt combination 132. Set screw fastener 136 is then loosened sufficiently to universally adjust (linearly to the desired height and rotationally to the desired angular position) step 108 relative to the pickup truck body. Set screw fastener 136 is then re-tightened to lock post 112 at the selected orientation.

The contact of EZ-UP Step 146 with any anticipated terrain can be prevented through adjustment of the height of step 108. In the first two embodiments, the lowest point of the disclosed EZ-UP Step 32 and EZ-UP Step 60 is the fixed bottom of their supporting post 34 and 62, respectively. Steps 40 and 68, respectively, are always higher than that lowest point. In the third embodiment, step 108 is always the lowest element in EZ-UP Step 146, and it has the ability to be raised as high off the ground as the level of the trailer hitch to which it is attached. If it is anticipated that the pickup truck will travel over unusually uneven terrain, the height of the step can be adjusted accordingly.

The inventive EZ-UP Step has been disclosed in combination with a pickup truck having a receiver type trailer hitch. While this is the preferred use, it is for illustration only. The disclosed auxiliary step takes advantage of the conventional features of the two most common types of trailer hitches, and this is beneficial, since no modifications of existing trucks or trailer hitches need be made. But, the applicability of the disclosed EZ-UP Step is apparent for all vehicles which need an auxiliary step to gain access to higher portions thereof, such as, the back door of school buses or truck campers, the roof racks of vans, RVs, or SUVs, the cargo areas of flatbed trucks, and the seats for tractors or All Terrain Vehicles.

EZ-UP Step is not limited to vehicles with pre-existing trailer hitches, either. If need be, such conventional trailer hitches can be added to any vehicle in order to adapt them for use of the disclosed EZ-UP Step.

Further, EZ-UP Step is not limited to trailer hitches at all. A hollow, tubular crossbar of the type shown in FIGS. 1 and 2, with or without the receiver and/or the brackets, can be added anywhere on a vehicle where an auxiliary step would be useful.

Finally, the shank is disclosed as being removably attached to the vehicle. It is within the scope of the invention that the shank be permanently attached, if desired, for instance by welding.

Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention as defined in the appended claims.

Further, the purpose of the foregoing Abstract is to enable the U.S. Patent and Trademark Office, and the public generally, and especially the scientists, engineers and practitioners in the art who are not familiar with patent or legal terms or phraseology, to determine quickly from a cursory inspection the nature and essence of the technical disclosure of the application. The Abstract is neither intended to define the invention of the application, which is measured solely by the claims, nor is intended to be limiting as to the scope of the invention in any way.

It can be seen from the above that an invention has been disclosed which fulfills all the objects of the invention. It is to be understood, however, that the disclosure is by way of illustration only and that the scope of the invention is to be limited solely by the following claims:

We claim:

1. An auxiliary step for attachment to a hollow tubular crossbar fixed to a motor vehicle, said crossbar being open at least at one end, said auxiliary step comprising:
   a shank, said shank being configured to be telescopically slidable within the hollow interior of said crossbar;
   a latch, said latch securing said shank to said crossbar;
   a step; and
   a coupler, said coupler joining said shank and said step for universal relative adjustment, said universal relative adjustment comprising both linear and rotational movement of said step relative to said shank.

2. The auxiliary step of claim 1 wherein said cross-sectional shape of said hollow tubular crossbar is one of the following: (a) square and (b) circular, and said shank has a cross-sectional shape corresponding to the cross-sectional shape of said hollow tubular crossbar.

3. The auxiliary step of claim 2 wherein said coupler comprises a post, a sleeve, and a fastener;
   said post being integrally joined with said step and extending vertically upwardly therefrom;
   said sleeve being integrally joined with said shank;
   said sleeve receiving said post therein for universal movement; and
   said fastener releasably securing said post and said sleeve against relative movement after said step has been adjusted relative to said shank.

4. The auxiliary step of claim 3 wherein said sleeve includes an aperture through a sidewall thereof, said fastener comprises a nut integral with said sleeve and a bolt rotatable within said nut, and said nut, bolt, and aperture are coaxially aligned, whereby said bolt acts as a set screw to lock said post within said sleeve.

5. The auxiliary step of claim 3 wherein said auxiliary step is constructed from one or more of the following materials: mild steel, carbon steel, stainless steel, aluminum deck plate, fiber reinforced plastics, and ABS (Acrylonitrile Butadiene Styrene).

6. The auxiliary step of claim 3 wherein said shank comprises a hollow cylinder comprising a main body portion and a secondary body portion, said main and secondary body portions being coaxial and contacting along mating sloped peripheries, and said latch comprises a latching cam, said latching cam comprising said mating peripheries in combination with a nut and bolt, said nut being integral with one end of said shank, and said bolt extending coaxially from the other end of said shank to threadedly mate with said nut, whereby tightening said nut and bolt skews said body portions out of axial alignment, thereby binding said shank within said crossbar.

7. The auxiliary step of claim 3 wherein said crossbar extends horizontally across said motor vehicle and is open at both ends.

8. The auxiliary step of claim 7 wherein said motor vehicle is a pickup truck and said crossbar is fixed to the frame of said pickup truck transverse the bed of said pickup truck adjacent the tailgate end of said pickup truck bed.

9. The auxiliary step of claim 3 wherein said latch comprises an aperture through said crossbar, a plurality of apertures through said shank, and a latch pin, whereby said latch pin secures said shank within said crossbar by passing through aligned apertures in said crossbar and said shank.

10. The auxiliary step of claim 2 wherein said coupler comprises a post, a sleeve, and a fastener;
   said post being integrally joined with said shank and depending vertically therefrom;
   said sleeve being integrally joined with said step, said sleeve receiving said post therein for universal movement; and
   said fastener releasably securing said post and said sleeve against relative movement after said step has been adjusted relative to said shank.

11. The auxiliary step of claim 10 wherein said latch comprises an aperture through said crossbar, said shank includes a plurality of apertures therethrough, and a latch pin, whereby said latch pin secures said shank within said crossbar by passing through aligned apertures in said crossbar and said shank.

12. The auxiliary step of claim 10 wherein said sleeve includes an aperture through a sidewall thereof, said fastener comprises a nut integral with said sleeve and a bolt rotatable within said nut, and said nut, bolt, and aperture are coaxially aligned, whereby said bolt acts as a set screw to lock said post within said sleeve.

13. The auxiliary step of claim 10 wherein said shank comprises a hollow cylinder comprising a main body portion and a secondary body portion, said main and secondary body portions being coaxial and contacting along mating sloped peripheries, and said latch comprises a latching cam, said latching cam comprising said mating peripheries in combination with a nut and bolt, said nut being integral with one end of said shank, and said bolt extending coaxially from the other end of said shank to threadedly mate with said nut, whereby tightening said nut and bolt skews said body portions out of axial alignment, thereby binding said shank within said crossbar.

14. The auxiliary step of claim 10 wherein said auxiliary step is constructed from one or more of the following materials: mild steel, carbon steel, stainless steel, aluminum deck plate, fiber reinforced plastics, and ABS (Acrylonitrile Butadiene Styrene).

15. The auxiliary step of claim 10 wherein said crossbar extends horizontally across said motor vehicle and is open at both ends.

16. The auxiliary step of claim 15 wherein said motor vehicle is a pickup truck and said crossbar is fixed to the frame of said pickup truck transverse the bed of said pickup truck near the tailgate end of said pickup truck bed.

* * * * *